United States Patent
Nakao

(10) Patent No.: US 7,856,870 B2
(45) Date of Patent: Dec. 28, 2010

(54) METHOD FOR ALARMING INNER PRESSURE LOWERING OF TIRES USING GPS INFORMATION AND DEVICE THEREOF, AND PROGRAM FOR ALARMING INNER PRESSURE LOWERING OF TIRES

(75) Inventor: Yukio Nakao, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1148 days.

(21) Appl. No.: 11/515,784

(22) Filed: Sep. 6, 2006

(65) Prior Publication Data

US 2007/0090933 A1    Apr. 26, 2007

(30) Foreign Application Priority Data

Oct. 21, 2005   (JP) .............................. 2005-307084

(51) Int. Cl.
   B60C 23/02   (2006.01)
(52) U.S. Cl. .................... 73/146.5; 73/146; 701/213
(58) Field of Classification Search ........................ None
   See application file for complete search history.

(56) References Cited

U.S. PATENT DOCUMENTS 7,483,794 B2 *   1/2009   Bocquillon et al. ........... 702/34

FOREIGN PATENT DOCUMENTS

| JP | 7-61215 A | 3/1995 |
|---|---|---|
| JP | 7-48407 Y2 | 11/1995 |
| JP | 10-119807 A | 5/1998 |
| JP | 11-194034 A | 7/1999 |
| JP | 2000-82198 A | 3/2000 |
| JP | 2001-253334 A | 9/2001 |
| JP | 2002-2240 A | 1/2002 |
| JP | 2002-8198 A | 1/2002 |
| JP | 2002-274357 A | 9/2002 |
| JP | 2004-175349 A | 6/2004 |
| JP | 2004-237947 A | 8/2004 |

* cited by examiner

*Primary Examiner*—Lisa M Caputo
*Assistant Examiner*—Jermaine Jenkins
(74) *Attorney, Agent, or Firm*—Birch, Stewart, Kolasch & Birch, LLP

(57) ABSTRACT

Provided is a method which is free from falling into a state impossible for detecting inner pressure lowering of tires even when GPS signals cannot be received and capable of precisely detecting inner pressure lowering of tires. A method for alarming inner pressure lowering of tires comprising a step of receiving satellite electric wave utilized for GPS and then detecting inner pressure lowering of tires utilizing the information of the satellite electric wave, and a step of detecting inner pressure lowering of tires utilizing wheel speed information, wherein said method comprises a step of judging whether the judgment result of inner pressure lowering of tires detected in the respective steps is adopted or not.

4 Claims, 5 Drawing Sheets

METHOD FOR ALARMING INNER PRESSURE LOWERING OF TIRES USING GPS INFORMATION AND DEVICE THEREOF, AND PROGRAM FOR ALARMING INNER PRESSURE LOWERING OF TIRES

BACKGROUND OF THE INVENTION

The present invention relates to a method for realizing a device detecting inner pressure lowering of tires at low cost and precisely.

Methods of detecting inner pressure lowering of tires from vehicle speed and distance which are calculated from GPS (Global Positioning System) information and rotational speed of tires have been conventionally disclosed in JP-A-2005-186739, JP-A-2003-146037, JP-A-2003-94920 and the like. However, it is necessary to detect change in rotational speed of tires only by inner pressure lowering in order to detect the inner pressure lowering of tires from vehicle speed which is calculated from GPS information and rotational speed of tires. Namely, it is necessary to exclude rotational speed change depending on a running state of a vehicle.

JP-A-2003-94920 discloses a method by which inner pressure lowering of tires is detected by comparing the running locus of a vehicle calculated from rotational information of tires with the running locus of a vehicle obtained from vehicle positional information by GPS and the like, but the exclusion of the rotational speed change depending on a running state of a vehicle is not indicated. Further, JP-A-2005-186739 and JP-A-2003-146037 specify a running state from comparison of the rotational state of mutual tires, but when inner pressure lowering of tires is generated, the relation of the rotational speed of mutual four wheels has already been unbalanced, therefore an accurate running state cannot be specified.

Further, there is also known a method of detecting inner pressure lowering of tires by calculating dynamic load radii of tires from a moving distance calculated from GPS information and rotational speed of tires, but since exclusion of rotational speed change depending on the running state of a vehicle is inadequate, precision is also inadequate.

Consequently, there is devised a method of detecting inner pressure lowering of tires by calculating a running speed of a vehicle utilizing satellite electric wave utilized for GPS and by calculating the dynamic load radii of tires from the speed information and rotational angular speed information of tires (see JP-A-2005-230791). However, the method had problems that when GPS signals cannot be received (in a building shade, woody zone and the like), dynamic load radii cannot be calculated and inner pressure lowering of tires cannot be detected.

SUMMARY OF THE INVENTION

An object of the present invention is to provide a method which is free from falling into a state impossible for detecting inner pressure lowering of tires even when GPS signals cannot be received and capable of precisely detecting inner pressure lowering of tires.

The present inventors have studied methods for solving the fore-mentioned problems and as a result, found that when GPS signals cannot be received, it is prevented by carrying out judgment of the inner pressure lowering only by wheel speed information to fall into a state impossible for detecting inner pressure lowering of tires, and at a state capable of receiving GPS signals, the reliability of judgment can be improved by having the third program for judging which judgment is prioritized in accordance with the state of receiving GPS signals using these two methods simultaneously, to complete the present invention.

Namely, the present invention relates to a method for alarming inner pressure lowering of tires comprising a step of receiving satellite electric wave utilized for GPS and then detecting inner pressure lowering of tires utilizing the information of the satellite electric wave, and a step of detecting inner pressure lowering of tires utilizing wheel speed information, wherein said method comprises a step of judging whether the judgment result of inner pressure lowering of tires detected in the respective steps is adopted or not.

The step of detecting inner pressure lowering of tires utilizing satellite electric wave information is preferably a step of judging inner pressure lowering of tires from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

The step of detecting inner pressure lowering of tires utilizing wheel speed information preferably comprises a step of detecting rotational information of respective tires, a step of calculating wheel speeds from the rotational information of respective tires, and a step of judging air pressure lowering of tires by comparing the mutual wheel speeds of four wheels.

Further, the present invention relates to a device for alarming inner pressure lowering of tires comprising a means of receiving satellite electric wave utilized for GPS and then detecting inner pressure lowering of tires utilizing the information of the satellite electric wave, and a means of detecting inner pressure lowering of tires utilizing wheel speed information, wherein said device comprises a means of judging whether the judgment result of inner pressure lowering of tires detected by the respective means is adopted or not.

Further, the present invention relates to a program for alarming inner pressure lowering of tires for functionalizing a computer as a procedure of receiving satellite electric wave utilized for GPS and detecting inner pressure lowering of tires utilizing the information of the satellite electric wave, a procedure of detecting inner pressure lowering of tires utilizing wheel speed information, and a procedure of judging whether the judgment result of inner pressure lowering of tires detected at the respective steps is adopted or not.

According to the present invention, when GPS signals cannot be received, it is prevented by carrying out judgment of inner pressure lowering only by wheel speed information to fall into a state impossible for detecting inner pressure lowering of tires, and at a state capable of receiving GPS signals, inner pressure lowering of tires can be precisely detected by having the third program for judging which judgment is prioritized in accordance with the state of receiving GPS signals using these two methods simultaneously.

DETAILED DESCRIPTION

Figure 1:
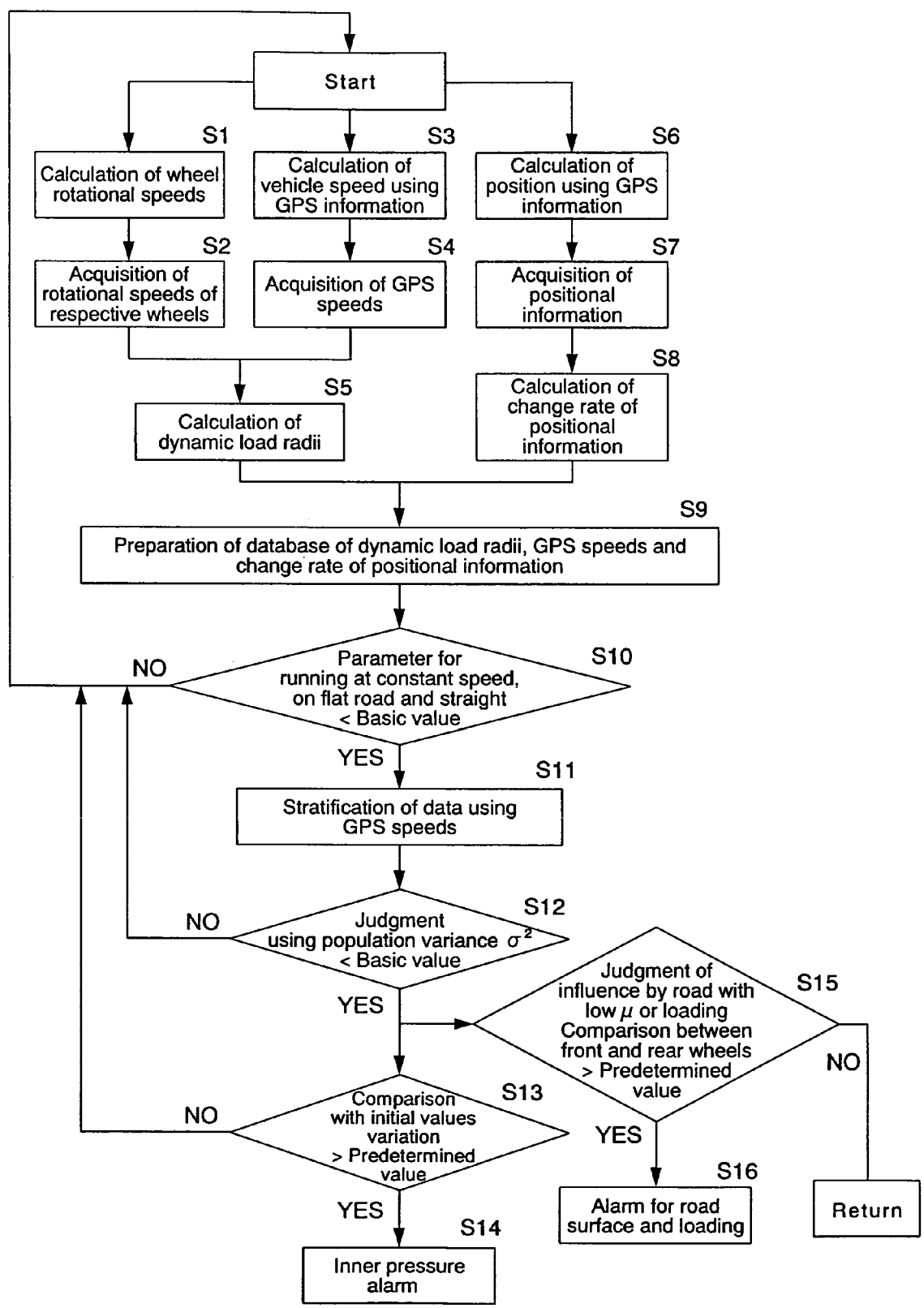
FIG. 1 is a diagram showing a flow chart of the program for detecting inner pressure lowering of tires using GPS signals.

The method for alarming inner pressure lowering of tires of the present invention comprises a step of receiving satellite electric wave utilized for GPS and then detecting inner pressure lowering of tires utilizing the information of the satellite electric wave, and a step of detecting inner pressure lowering of tires utilizing wheel speed information.

Herein, the step of detecting inner pressure lowering of tires utilizing satellite electric wave information is preferably, for example, a step of judging inner pressure lowering of tires from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and judging the apparent dynamic load radius to be effective only when a running state is judged to be straight on a flat road at a constant speed from GPS positioning information.

A GPS device has been installed on many vehicles in accordance with the prevalence of car navigations. Thereby, positioning technique by a GPS device has been also improved and a device specified to the calculation of speed (for example, GPS type speed meter VBOX manufactured by Race Logic Inc., England) is also commercially available at present. Inner pressure lowering of tires can be detected using calculation speed by a speed meter using a GPS device (hereinafter, referred to as GPS speed).

Assuming that tires have no slip, dynamic load radii (R) of tires can be calculated by using GPS speed as vehicle speed and comparing it with the rotational speed (rotational number per unit time) of tires.

$$V(m/s) = 2\pi R(m) \cdot Freq(Hz)/N(piece)$$

N is tooth number per one rotation of an axle of a tire rotational speed detector. Freq (Hz) is a figure by which the teeth of the rotational speed detector are counted per one second.

Herein, when V is rewritten to the output Vgps (km/h) of the GPS speed meter, $$Vgps(km/h) = 2\pi R(m) \cdot Freq(Hz) \cdot 3.6/N(piece)$$

Accordingly, $$R(m) = (N/2\pi \cdot 3.6) \cdot Vgps(km/h)/freq(Hz) \quad (1)$$

In case of N=48, $$\text{Dynamic load radius } R(m) = 2.122066 \cdot Vgps(km/h)/Freq(Hz) \quad (1)'$$

Herein, when the influence of slip rate at linear running can be excluded, the dynamic load radii of tires at running can be measured (calculated). Further, when the inner pressure is lowered, the dynamic load radii of tires are decreased; therefore if the dynamic load radii of tires at running can be measured precisely, the inner pressure lowering of tires can be detected.

With respect to the output frequency and output precision of the GPS speed meter, the precision of 0.01 km/h at an output of 20 Hz is published in case of the fore-mentioned VBOX. According to the precision, when speed is at least 10 km/h, the precision of at least 0.1% is obtained; therefore since the dynamic load radius change of general tires when the inner pressure of tires is decreased by 25% is several tenth %, the precision of detection is adequate.

However, it is required to prevent the influence of tire rotational speed change caused by causes other than the inner pressure change of tires which is the object of measurement in order to precisely measure (calculate) the dynamic load radii of tires. Namely, it is required to exclude measurement data of tire rotational speed affected by causes other than the inner pressure of tires as invalid data, so as not to be utilized for the calculation of the dynamic load radius.

Great change of slip rate remarkably occurs when a vehicle is accelerated or decelerated, but the slip rates of drive wheels are changed according to the influence of gravity acceleration even if at constant speed running, when a vehicle runs on a sloping road. Further, since rotational speed differs between an inner wheel side and an outer wheel side along a running locus at rotating a steering, the measurement result of the dynamic load radii is affected.

As a countermeasure for this, the GPS positioning information can be utilized. Running direction can be obtained for judgment of linear running or not by the GPS positioning information and straight driving or not can be judged from change quantity thereof per unit time. Further, altitude can be similarly obtained from the GPS positioning information for confirming whether running is on a flat road or not and it can be judged from the change quantity per unit time whether the road is flat or not. With respect to acceleration and deceleration, constant speed running can be judged by the level of acceleration by time-differentiating the GPS speed information calculated.

Thus, the running condition of a vehicle can be judged by utilizing the GPS information with high precision and the range of running condition at which the data of tire rotational speed are suitable for the calculation of dynamic load radii can be limited by setting a fixed basis.

Shown in FIG. 1 is a flow chart of the calculation program for measuring (calculating) the dynamic load radii of tires and detecting inner pressure lowering of tires based on the technical items illustrated here, wherein the method of using the mean value of measurement values for improving the precision of the measurement (calculation) of the dynamic load radii is used and statistical procedure for selecting data adopted for the calculation of an average value is used.

In FIG. 1, the rotational speeds of respective wheels are acquired (calculated) based on the output signals of the wheel (tire) rotational speed detector at the steps S1 and S2.

The running speed of a vehicle based on the GPS information is acquired at the steps S3 and S4.

The dynamic load radii of respective wheels are calculated from the rotational speeds of respective wheels and the GPS speed of the vehicle at the step S5.

The time rate of change the GPS positioning information is calculated at the steps S6, S7 and S8, thereon calculating figures with respect to running conditions such as the rising and lowering speed on a sloping road and right and left rotational angular speeds by handling. Figures with respect to the level of acceleration and the level of deceleration can be calculated either at both the steps S4 or S8.

At the step S9, a combination of the dynamic load radii, the GPS speed, positioning information change rate and the like is acquired at various running conditions to be stored as a database and the initialization of the database is carried out. Various judgment basis values are also stored together with the database.

At the step S10, in order to judge whether the running conditions satisfy conditions such as constant speed running, flat road running and linear running, the running conditions are compared with the respective judgment basis values, and it is judged whether the data obtained at actual running are data suitable for the detection of the inner pressure of tires. When the data are inappropriate data, they are not used as the data for the detection of the inner pressure of tires, to be excluded and let return to the routine of measurement again.

At the step S11, the measurement values of the dynamic load radii are stratified (classified) in accordance with the hierarchy of the GPS speed.

At the step S12, the unevenness of the dynamic load radius data by every GPS speed hierarchy stratified at the step S11 is judged by population variance and when a dispersion value ($\sigma^2$) is smaller than the basis value, it is referred to as effective data.

At the step S13, the average value of data of the dynamic load radii which were judged as effective at the step 12 is compared with the initial value and when the difference is large, inner pressure (lowering) alarm is issued at the step S14.

At the step S15, the front wheel average value of the average value of data of the dynamic load radii which are judged as effective at the step S12 is compared with the rear wheel average value thereof and when the difference between front wheels and rear wheels is large, the low frictional coefficient ($\mu$) of road surface or loading abnormality is assumed and at the step S16, road surface or loading abnormality alarm is issued.

The examples of the steps of detecting inner pressure lowering of tires utilizing wheel speed information are preferably a step of detecting the rotational information of respective tires, a step of calculating wheel speeds from the rotational information of respective tires and a step of judging the air pressure lowering of tires comparing the mutual wheel speeds of four wheels.

Figure 2:
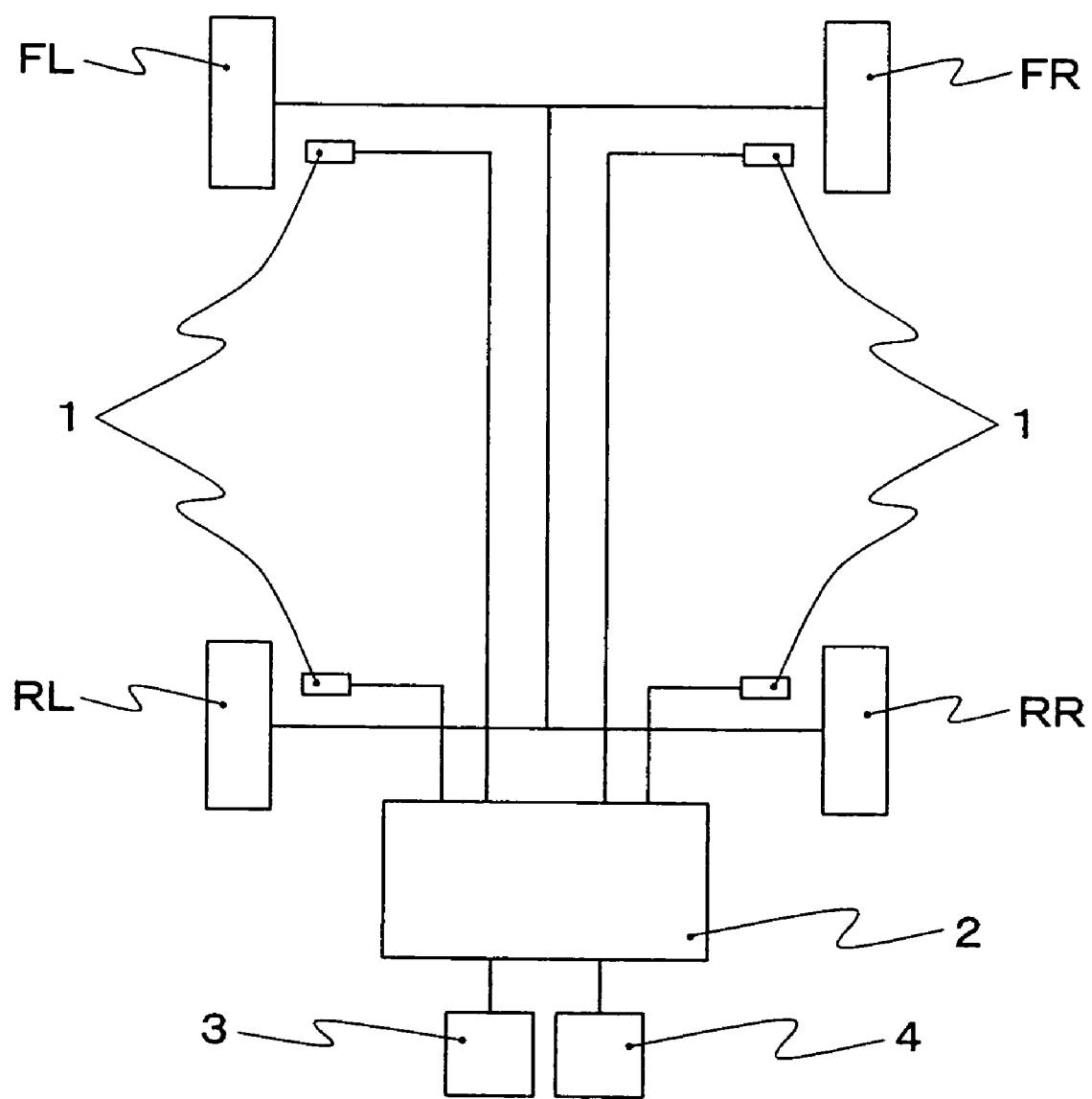
FIG. 2 is a block diagram showing one embodiment of the device for detecting inner pressure lowering of tires.

As shown in FIG. 2, the device for alarming inner pressure lowering of tires relating to the one embodiment of the present invention detects whether the air pressure of four tires provided on a four wheel vehicle such as, for example, FL, FR, RL and RR (hereinafter, generically named as Wi, wherein, i=1 to 4, 1: front left tire, 2: front right tire, 3: rear left tire and 4: rear right tire) is lowered or not, and is equipped with a usual rotational information detection means 1 which is provided in relevant to each of the tires Wi.

As the rotational information detection means 1, there can be used a wheel speed sensor which generates rotation pulses using an electromagnetic pickup and the like and measures the wheel speed (rotational speed) from the number of pulses, or an angular speed sensor including those which generate electric power as a dynamo utilizing rotation and measure the wheel speed from the obtained voltage, or the like. The output of the rotational information detection means 1 is provided for a control unit 2 which is the computer of ABS (Antilock Brake System) and the like. Connected with the control unit 2 are an alarming display 3 which is composed of a liquid crystal display element, a plasma display element or CRT for informing a tire Wi whose air pressure was lowered and an initialization switch 4 which can be operated by a driver.

Figure 3:
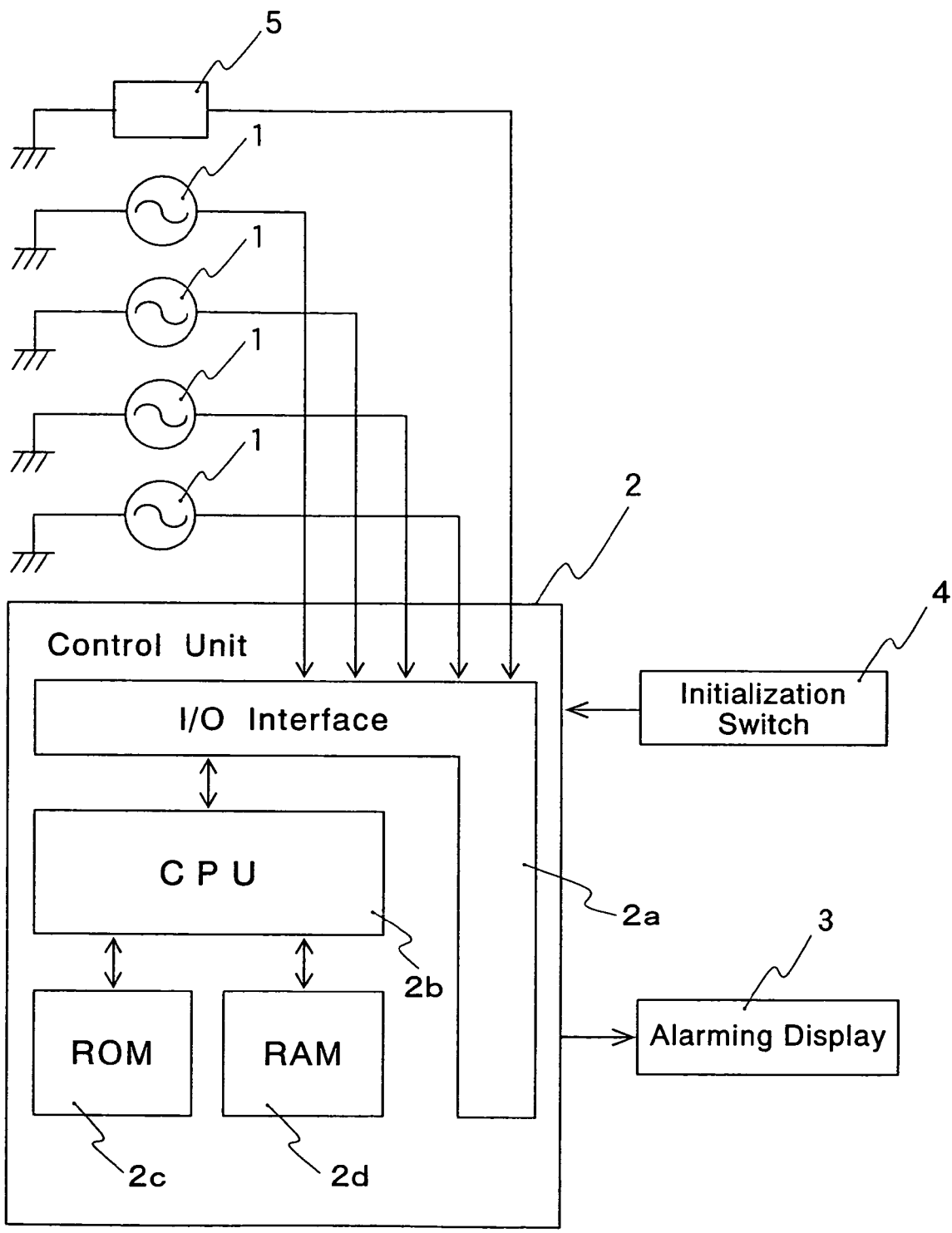
FIG. 3 is a block diagram showing an electrical composition of the device for detecting inner pressure lowering of tires of FIG. 2.

As shown in FIG. 3, the control unit 2 is composed of an I/O interface $2a$ necessary for delivery and receipt of signal with an external device, a CPU $2b$ functioning as the center of computation, a ROM $2c$ in which the control operation program of the CPU $2b$ is stored, and a RAM $2d$ in which data are temporarily written when the CPU $2b$ carries out control operation and the data written are read out.

Pulse signal (hereinafter, referred to as the wheel speed pulse) corresponding to the rotational speed of each of tires Wi is output in the rotational information detection means 1. Further, the rotational angular speed Fi of each of tires Wi is calculated at the CPU $2b$ by every fixed sampling cycle $\Delta T$ (sec), for example, $\Delta T$ is 1 second, based on the wheel speed pulse output from the rotational information detection means 1.

Herein, since the tires Wi are produced including fluctuation (initial difference) within specification, the effective rolling radii (values obtained by dividing a distance advancing by one rotation by $2\pi$) of respective tires Wi are not always the same even if all tires Wi are at normal inner pressure. Accordingly, the rotational angular speeds Fi of the respective tires Wi are fluctuated. Consequently, the rotational angular speeds F1$i$ which are corrected for negating the fluctuation caused by the initial difference are calculated. Specifically, they are corrected as follows.

F11=F1

F12=mF2

F13=F3

F14=nF4

The rotational angular speed Fi is calculated, for example, under condition that a vehicle runs linearly and the forementioned correction coefficients m and n are obtained as m=F1/F2 and n=F3/F4 based on the rotational angular speed Fi calculated. The wheel speeds Vi of tires of respective wheels are calculated based on the F1$i$.

The judgment of the reduced pressure of four wheel tires can be carried out by mutually comparing the respective wheel speeds of four wheel tires used for control of ABS. Namely, inner pressure lowering of respective wheels is designed to be detected by comparing mutual speeds without using absolute speed. Accordingly, the simultaneous reduced pressure of four wheels cannot be detected.

Figure 4:
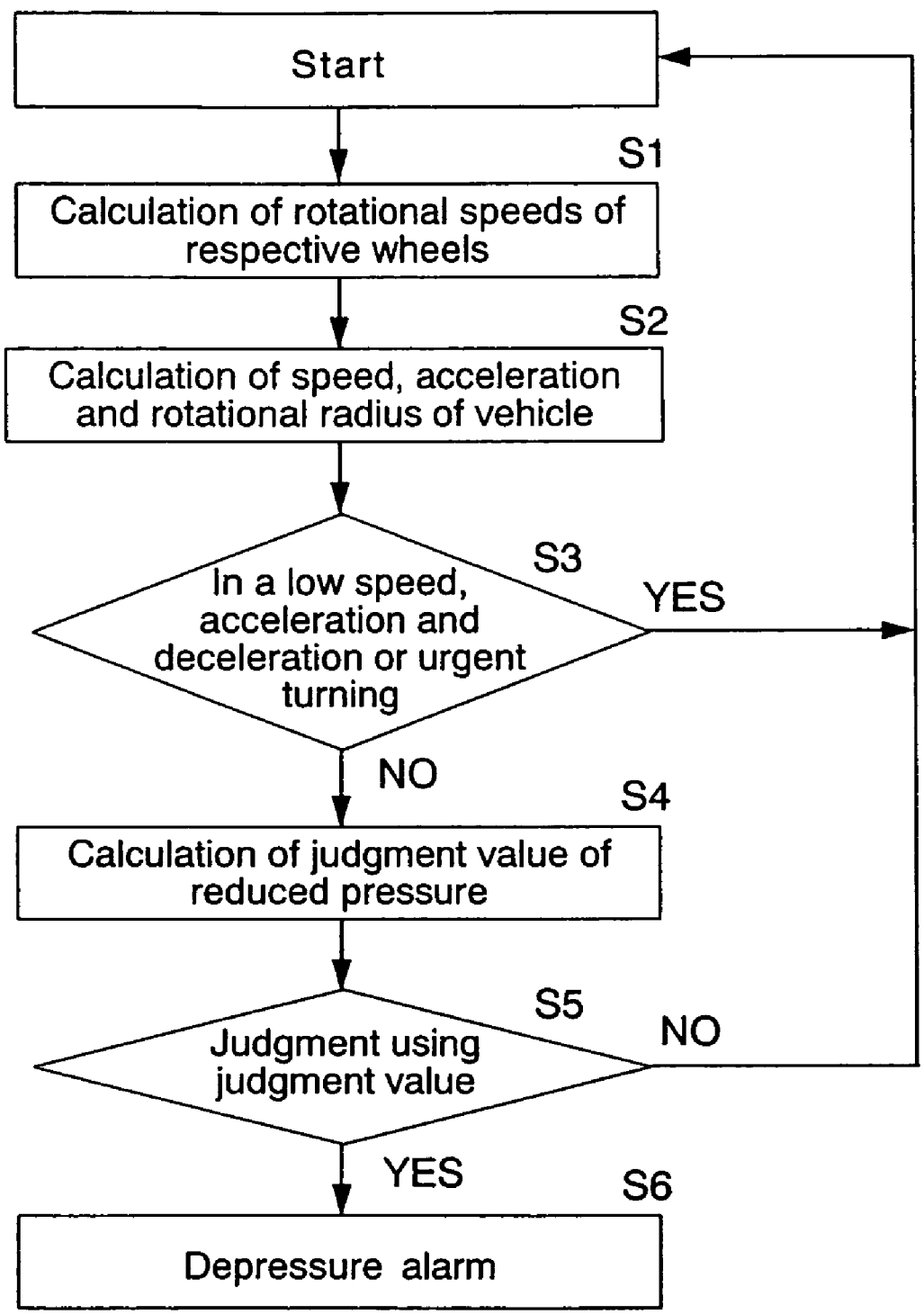
FIG. 4 is a diagram showing a flow chart of the program for detecting inner pressure lowering of tires by wheel speed.

Then, according to FIG. 4, the operation of the device detecting air pressure lowering of tires is illustrated.

Firstly, the wheel speeds Vi (i: 1 to 4) of respective four tires of a vehicle are calculated using wheel speed data of respective wheel tires of a vehicle obtained from a sensor such as an ABS sensor at a certain time (step S1). Then, the vehicle speed V is calculated by, for example, ITS. Further, vehicle acceleration and the rotational radius of the vehicle are calculated (step S2).

Herein, the rotational angular speeds of tires are fluctuated not only by the initial difference, but also by the difference between the rotational radius of a tire at inside corner and the rotational radius of a tire at outside corner, for example, when a vehicle runs a corner and the load movement in the vehicle. Accordingly, when it is judged that the vehicle is in a low speed, acceleration and deceleration or urgent turning, the judgment of reduced pressure shall be not carried out (step S3). In case of not corresponding to either of them, the judgment value of reduced pressure is calculated (step S4) and when the vehicle speed Vi (i=1) is larger than the absolute speed SV by a fixed value for at least T time, for example, for at least 10 seconds and difference is a level exceeding 0.03, it is judged that the pressure of the tire is reduced and an alarm is issued (steps S5 and S6). If the vehicle speed Vi (i=1) is equal to the absolute speed SV by the time T time has passed, it is judged that the pressure of the tire is not reduced.

The program for alarming the inner pressure lowering of tires of the present invention is characterized in having two procedures of a procedure of receiving satellite electric wave utilized for GPS and detecting inner pressure lowering of tires utilizing the information of the satellite electric wave (referred to as the procedure A), and a procedure of detecting the inner pressure lowering of tires utilizing wheel speed information (referred to as the procedure B), and further has the third procedure of judging which of the judgment results is prioritized.

Figure 5:
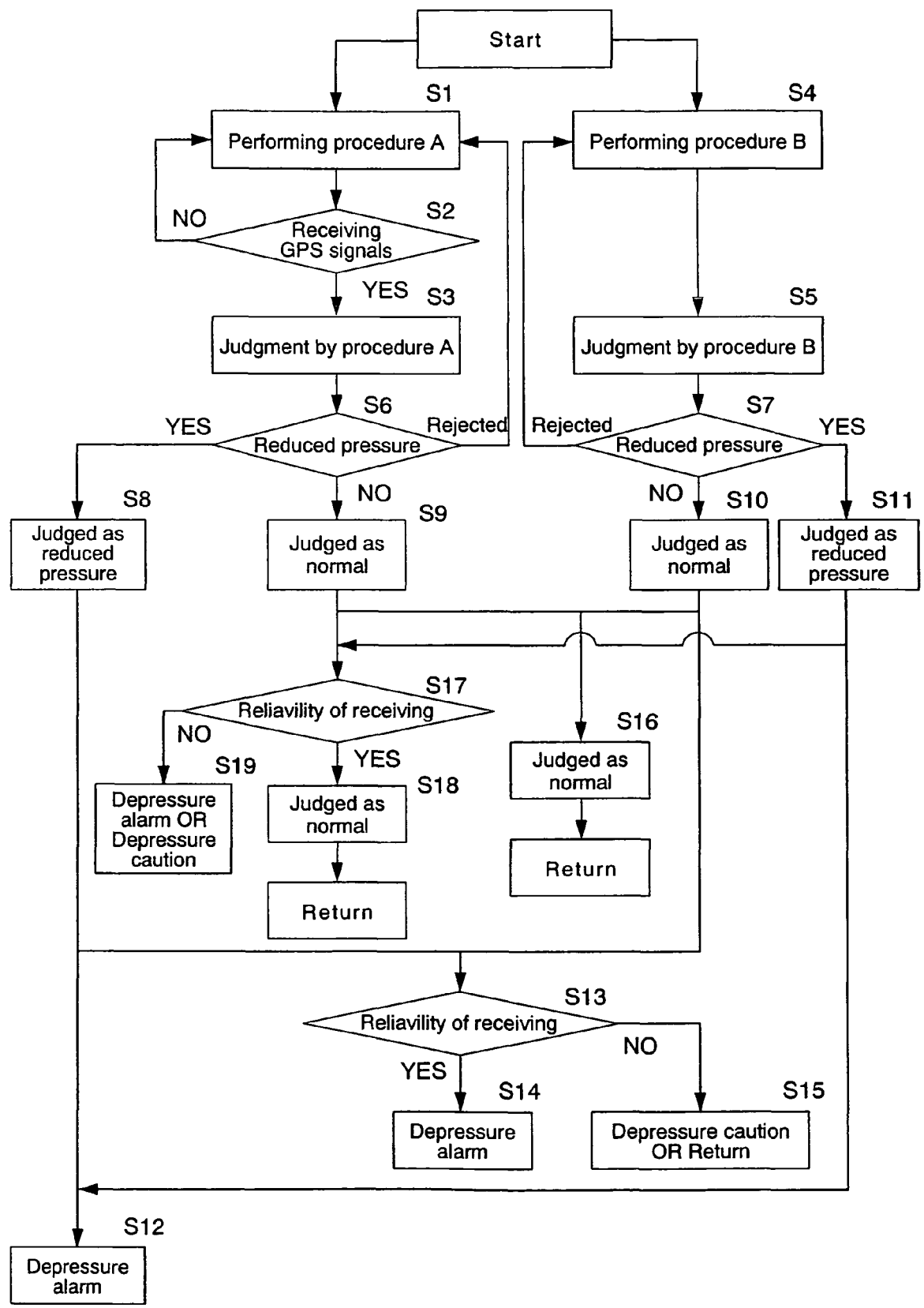
FIG. 5 is a diagram showing a flow chart of the third program for judging which result of the program for detecting inner pressure lowering of tires using GPS signals and the program for detecting inner pressure lowering of tires by wheel speed is prioritized.

As shown in FIG. 5, the following judgment is carried out at the third procedure.
1. After performing the procedures A and B respectively (steps S1 and S4), the result of judgment by the wheel speed information (step S5) is provided as a true state (step S10 or S11) when the GPS signals cannot be received or the judgment value of inner pressure lowering judged from the GPS signals are greatly deviated from the basis value in the procedure A (step S2) (when the judgment by wheel speed is rejected, judgment is not carried out (step S7)).
2. When the GPS signals can be received but inner pressure judgment by the GPS signals (step S3) cannot be carried out (rejected condition) (step S6), the result of judgment by the wheel speed information is provided as a true state (step S10 or S11) (when the judgment by wheel speed is also rejected, judgment is not carried out (step S7)).
3. When the GPS signals can be received and inner pressure judgment by the GPS signals are carried out (step S8), it is compared with the judgment by the wheel speed information, and 3-1. when the judgment by the wheel speed information is also inner pressure lowering (step S11), alarm for inner pressure lowering is insured (step S12); and 3-2. when the judgment by the wheel speed information is normal (step S10), either of issuing of alarm/no alarm/issuing of caution is selected (steps S14 and S15).
4. When the GPS signals can be received and it is judged that the inner pressure by the GPS signals are normal (step S9), it is compared with the judgment by the wheel speed information, and 4-1. when the judgment by the wheel speed information is also normal (step S10), it is judged as normal and alarm is not issued (step S16); and 4-2. when the judgment by the wheel speed information is inner pressure lowering (step S11), either of issuing of alarm/no alarm/issuing of caution is selected (steps S18 and S19).
5. In case of 3-2 and 4-2, it can be arbitrarily set in the third program which alarm among issuing of alarm/no alarm/issuing of caution is selected (steps S13 and S17). For example, when the reception state of the GPS signals are unstable, the result by wheel speed is prioritized and when the reception state is normal, the result by the GPS signals can be prioritized. Herein, the number of receiving satellite, the information related to satellite arrangement and the information related to the altitude (angle) of the satellite can be used for the judgment of the reception state of the GPS signals.

Further, a state in which GPS cannot be received means a state in which the minimum number of signals necessary for calculating position and speed as the GPS information cannot be received. Usually, 4 or more of information at 3 points of positioning and time are necessary and it is said that the more the number is, the higher the precision is. Accordingly, when the acquisition number of the satellites is a fixed value (for example, 6) or more, the result by GPS is prioritized and in other cases, the judgment only by the wheel speed is prioritized. Further, when an apparently abnormal value caused by any noise is generated in the case of judging only by the wheel speed, it is desirable to devise the judgment program by the wheel speed so as to exclude the result.

EXAMPLES

The present invention is specifically illustrated below based on Examples, but the present invention is not limited only to these Examples.

The conditions of an actual running test for confirming the performance of the method for alarming inner pressure lowering of tires of the present invention are shown together with a test course.

Type of Test Vehicle: Audi A4

GPS speed meter: V-BOX II (manufactured by Race Logic Co.)

Test place: Okayama Test Course of Sumitomo Rubber Industries, Ltd. and peripheral general roads Test Conditions Tire type: 205/55R16 SP9000

Basic inner pressure: 220 kPa (front wheels), 210 kPa (rear wheels)

Reduced pressure by 40%: 132 kPa (front wheels), 126 kPa (rear wheels)

Initial Values of Dynamic Load Radii

@ 40±20 km/h Front wheels: 304.9 mm Rear wheels: 304.5 mm

@ 80±20 km/h Front wheels: 305.2 mm Rear wheels: 304.8 mm

@ 120±20 km/h Front wheels: 306.0 mm Rear wheels: 305.6 mm

@ 160±20 km/h Front wheels: 307.4 mm Rear wheels: 307.0 mm

Judgment Criteria of Running Conditions

Linear running: change in running direction information (0 to 360 degrees) for one second is within one degree Judgment of sloping road: variation of the altitude information for 5 seconds is within 1 m Acceleration and deceleration: time differential of GPS speed is within 0.1 G Stratified speed: 20 to 60 km/h, 60 to 100 km/h, 100 to 140 km/h and 140 to 180 km/h Judgment of population variance: accumulation of 30 pieces $\sigma^2 < 0.1$ Basic value of comparison between the front and rear wheels: at least 1%

Calculation method=((Average value of front wheel measurement/Initial average value of front wheels)−(Average value of rear wheel measurement/Initial average value of rear wheels))×100

Running Conditions 2 persons on board. The vehicle ran on a circuit road at a speed of 110 to 130 km/h. The vehicle ran on various handling roads at a speed of at most 60 km/h.

<Third Program>

Reliability judgment condition of inner pressure measurement by GPS: the number of a captured satellite for GPS is at least 6

When the above-mentioned condition is satisfied, the judgment by GPS was prioritized and in other case, the judgment result of inner pressure lowering of tires by the wheel speed information was prioritized. The judgment result is shown in Table 1.

TABLE 1

| 40%-depressured | Judgment by program using GPS | Number of captured satellite | Judgment by program using wheel speed | Judgment result by third program | Comparison with conventional method |
|---|---|---|---|---|---|
| Only FL wheel | Detected | 7 | Detected | Depressure alarming | Equal |
|  | Detected | 5 | Detected | Depressure alarming | Improved accuracy |
|  | Unable to be detected (Rejected) | 8 | Detected | Depressure alarming | Improved detection frequency |
|  | Unable to be detected (Unable to be calculated) | 2 | Detected | Depressure alarming | Improved detection frequency |
|  | Detected | 8 | Unable to be detected (Rejected) | Depressure alarming | Improved detection frequency |
|  | Detected | 5 | Unable to be detected (Rejected) | No alarming | Equal |
|  | Normal (Error alarming) | 4 | Detected | Depressure alarming | Improved accuracy |
| All four wheels | Detected | 8 | Unable to be detected | Depressure alarming | Improved detection frequency |
|  | Detected | 4 | Unable to be detected | No alarming | Equal |
|  | Unable to be detected (Rejected) | 8 | Unable to be detected | No alarming | Equal |
|  | Unable to be detected (Unable to be calculated) | 2 | Unable to be detected | No alarming | Equal |

According to the method for alarming inner pressure lowering of tires of the present invention, it is confirmed that precision and frequency of detection are more improved according to the result of Table 1 than detection by a single program respectively of a program of detecting the inner pressure lowering of tires utilizing the GPS signals and a program of detecting the inner pressure lowering of tires utilizing the wheel speed information, without the generation of an error alarming.

What is claimed is:

1. A method for alarming inner pressure lowering of tires comprising:

receiving satellite electric wave utilized for GPS;

detecting inner pressure lowering of tires utilizing information of the satellite electric wave; and detecting inner pressure lowering of tires utilizing wheel speed information;

judging whether the judgment result of inner pressure lowering of tires detected in the detecting steps is adopted or not, wherein the step of detecting inner pressure lowering of tires utilizing satellite electric wave information comprises judging inner pressure lowering of tires from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and wherein judging the apparent dynamic load radius to be effective only when a running state is judged to be straight on a flat road at a constant speed from GPS positioning information.

2. The method of claim 1, wherein the step of detecting inner pressure lowering of tires utilizing wheel speed information comprises a step of detecting rotational information of respective tires, a step of calculating wheel speeds from the rotational information of respective tires, and a step of judging air pressure lowering of tires by comparing the mutual wheel speeds of four wheels.

3. A device for alarming inner pressure lowering of tires comprising:

means for receiving satellite electric wave utilized for GPS;

first means for detecting inner pressure lowering of tires utilizing information of the satellite electric wave; and second means for detecting inner pressure lowering of tires utilizing wheel speed information, means for judging whether the judgment result of inner pressure lowering of tires detected by the first and second detecting means is adopted or not, wherein the first means for detecting inner pressure lowering of tires utilizing satellite electric wave information comprises means for judging inner pressure lowering of tires from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and wherein judging the apparent dynamic load radius to be effective only when a running state is judged to be straight on a flat road at a constant speed from GPS positioning information.

4. A computer program product for alarming inner pressure lowering of tires, the computer program product being embodied on a non-transitory computer readable medium, the computer program product comprising computer-executable instructions of:

receiving satellite electric wave utilized for GPS;

detecting inner pressure lowering of tires utilizing information of the satellite electric wave;

detecting inner pressure lowering of tires utilizing wheel speed information; and judging whether the judgment result of inner pressure lowering of tires detected in the detecting steps is adopted or not, wherein the step of detecting inner pressure lowering of tires utilizing satellite electric wave information comprises judging inner pressure lowering of tires from change in size of dynamic load radii by comparing an effective dynamic load radius with an initial value preliminarily stored as a dynamic load radius at a normal inner pressure, wherein the effective dynamic load radius is obtained by calculating an apparent dynamic load radius of a tire at running by successively comparing a calculated speed of a vehicle by a GPS device, in which the speed of the vehicle at running is calculated from information obtained by the GPS device, with a rotational speed of the tire obtained by a tire rotational speed detection apparatus installed on tire rotational portions of four wheels of the vehicle, and wherein judging the apparent dynamic load radius to be effective only when a running state is judged to be straight on a flat road at a constant speed from GPS positioning information.

* * * * *